(12) United States Patent
Stein et al.

(10) Patent No.: US 8,064,643 B2
(45) Date of Patent: Nov. 22, 2011

(54) DETECTING AND RECOGNIZING TRAFFIC SIGNS

(75) Inventors: Gideon P. Stein, Jerusalem (IL); Ori Shachar, Jerusalem (IL); Yoav Taieb, Jerusalem (IL); Uri Wolfovitz, Haifa (IL)

(73) Assignee: Mobileye Technologies Limited, Nicosia (CY)

( * ) Notice: Subject to any disclaimer, the term of this patent is extended or adjusted under 35 U.S.C. 154(b) by 1019 days.

(21) Appl. No.: 11/951,405

(22) Filed: Dec. 6, 2007

(65) Prior Publication Data

US 2008/0137908 A1   Jun. 12, 2008

Related U.S. Application Data

(60) Provisional application No. 60/868,783, filed on Dec. 6, 2006.

(51) Int. Cl.
*G06K 9/00* (2006.01)

(52) U.S. Cl. ........ 382/104; 382/103; 382/107; 382/181; 701/96

(58) Field of Classification Search ................ 382/103, 382/104, 181, 107; 701/96
See application file for complete search history.

(56) References Cited

U.S. PATENT DOCUMENTS

| | | | |
|---|---|---|---|
| 5,850,254 A * | 12/1998 | Takano et al. | 348/148 |
| 6,246,961 B1 * | 6/2001 | Sasaki et al. | 701/301 |
| 6,593,698 B2 * | 7/2003 | Stam et al. | 315/82 |
| 6,704,621 B1 | 3/2004 | Stein et al. | |
| 6,813,545 B2 | 11/2004 | Stromme | |
| 7,113,867 B1 * | 9/2006 | Stein | 701/301 |
| 7,327,855 B1 * | 2/2008 | Chen | 382/104 |
| 7,566,851 B2 * | 7/2009 | Stein et al. | 250/205 |
| 7,764,808 B2 * | 7/2010 | Zhu et al. | 382/104 |
| 2006/0034484 A1 * | 2/2006 | Bahlmann et al. | 382/103 |
| 2007/0221822 A1 | 9/2007 | Stein et al. | |

FOREIGN PATENT DOCUMENTS

EP   1930863 A2   11/2008

OTHER PUBLICATIONS

Extended Search report by European Patent Office dated Jul. 23, 2008 in corresponding application No. EP 07122458.8.
Communication of intention to grant by European Patent Office dated Mar. 29, 2011 in corresponding application No. EP 07122458.8.
Examiners signatures and claims by European Patent Office dated Mar. 14, 2011 in corresponding application No. EP 07122458.8.

* cited by examiner

*Primary Examiner* — Wesley Tucker

(57) ABSTRACT

A method for detecting and identifying a traffic sign in a computerized system mounted on a moving vehicle. The system includes a camera mounted on the moving vehicle. The camera captures in real time multiple image frames of the environment in the field of view of the camera and transfers the image frames to an image processor. The processor is programmed for performing the detection of the traffic sign and for performing another driver assistance function. The image frames are partitioned into the image processor into a first portion of the image frames for the detection of the traffic sign and into a second portion of the image frames for the other driver assistance function. Upon detecting an image suspected to be of the traffic sign in at least one of said image frames of the first portion, the image is tracked in at least one of the image frames of the second portion.

13 Claims, 10 Drawing Sheets

DETECTING AND RECOGNIZING TRAFFIC SIGNS

CROSS REFERENCE TO RELATED APPLICATIONS

This application claims the benefit under 35 USC 119(e) of U.S. provisional application 60/868,783 filed on Dec. 6, 2006, the disclosure of which is included herein by reference.

FIELD OF THE INVENTION

The present invention relates to driver assistance systems in motorized vehicles. Specifically, the present invention includes methods for detecting and recognizing traffic signs using a driver assistance system (DAS) which includes a camera and an image processor mounted in a moving vehicle. The camera captures a series of images of the vehicle environment, e.g. of the road in front of the moving vehicle

BACKGROUND OF THE INVENTION AND PRIOR ART

Traffic sign recognition may be based on the characteristic shapes and colors of the traffic signs rigidly positioned relative to the environment situated in clear sight of the driver.

Known techniques for traffic sign recognition utilize at least two steps, one aiming at detection, and the other one at classification, that is, the task of mapping the image of the detected traffic sign into its semantic category. Regarding the detection problem, several approaches have been proposed. Some of these approaches rely on gray scale data of images. One approach employs a template based technique in combination with a distance transform. Another approach utilizes a measure of radial symmetry and applies it as a pre-segmentation within the framework. Since radial symmetry corresponds to a simplified (i.e., fast) circular Hough transform, it is particularly applicable for detecting possible occurrences of circular signs.

Other techniques for traffic sign detection use color information. These techniques share a two step strategy. First, a pre-segmentation is employed by a thresholding operation on a color representation, such as Red Green Blue (RGB). Linear or non-linear transformations of the RGB representation have been used as well. Subsequently, a final detection decision is obtained from shape based features, applied only to the pre-segmented regions. Corner and edge features, genetic algorithms and template matching have been used.

A joint approach for detection based on color and shape has also been proposed, which computes a feature map of the entire image frame, based on color and gradient information, while incorporating a geometric model of signs.

For the classification task, most approaches utilize well known techniques, such as template matching, multi-layer perceptrons, radial basis function networks, and Laplace kernel classifiers. A few approaches employ a temporal fusion of multiple frame detection to obtain a more robust overall detection.

US patent application publication 2006/0034484 is included herein by reference for all purposes as if entirely set forth herein. US patent application publication 2006/0034484 discloses a method for detecting and recognizing a traffic sign. A video sequence having image frames is received. One or more filters are used to measure features in at least one image frame indicative of an object of interest. The measured features are combined and aggregated into a score indicating possible presence of an object. The scores are fused over multiple image frames for a robust detection. If a score indicates possible presence of an object in an area of the image frame, the area is aligned with a model. A determination is then made as to whether the area indicates a traffic sign. If the area indicates a traffic sign, the area is classified into a particular type of traffic sign. The present invention is also directed to training a system to detect and recognize traffic signs.

U.S. Pat. No. 6,813,545 discloses processes and devices which recognize, classify and cause to be displayed traffic signs extracted from images of traffic scenes. The processes analyze the image data provided by image sensors without any pre-recognition regarding the actual scenario.

The terms "driver assistance system" and "vehicle control system" are used herein interchangeably. The term "driver assistance function" refers to the process or service provided by the "driver assistance system" The terms "camera" and "image sensor" are used herein interchangeably. The term "host vehicle" as used herein refers to the vehicle on which the driver assistance system is mounted.

SUMMARY OF THE INVENTION

According to the present invention there is provided a method for detecting and identifying a traffic sign in a computerized system mounted on a moving vehicle. The system includes a camera which captures in real time multiple image frames of the environment in the field of view of the camera and transfers the image frames to an image processor. The processor is programmed for performing the detection of the traffic sign and for performing another driver assistance function. The image frames are partitioned into a first portion of the image frames for the detection of the traffic sign and into a second portion of the image frames for the other driver assistance. Upon detecting an image suspected to be of the traffic sign in at least one of said image frames of the first portion, the image is tracked in at least one of the image frames of the second portion. The partitioning preferably includes first setting a camera parameter for the detection of the traffic sign while capturing the image frames of the first portion. The partitioning preferably includes setting the camera parameter for the other driver assistance while capturing the image frames of the second portion. The settings for the camera parameter have typically different values for the traffic sign recognition system and for the other driver assistance. The tracking is preferably performed without altering the set values of the camera parameter. The setting of the camera parameter for at least one of the image frames of the first portion is preferably based on image information solely from the image suspected to be of the traffic sign of at least one previous image frame of the first portion. The image information preferably includes a histogram of intensity values and the camera parameter is preferably a gain control.

The other driver assistance function is optionally provided by a forward collision warning system which measures a distance to a lead vehicle based on the second portion of the image frames. When the image scales with the distance to the lead vehicle, further processing is preempted by associating the image to be of an object attached to the lead vehicle.

The other driver assistance function is optionally provided by a lane departure warning system from which is determined the lane in which the moving vehicle is traveling. When the image is of a traffic sign associated with another lane of traffic further processing of the image is preempted, by associating the image as an image of traffic sign for the other lane of traffic.

The driver assistance function is optionally provided by an ego-motion system which estimates from the second portion of the image frames an ego-motion including a translation in the forward direction and rotation of the moving vehicle. The tracking is preferably performed while calibrating the effect of the ego-motion. Further processing of the image is pre-empted if after the tracking and the calibrating, the motion of the image between the image frames of the second portion is inconsistent with a static traffic sign. The classification is preferably performed based on shape and/or color. Prior to the classification, a classifier is preferably trained using a group of known images of traffic signs. When the shape of the traffic sign includes a circle and the traffic sign is a circular traffic sign, a decision is preferably made based on the output of the classifier that the circular traffic sign is a speed limit traffic sign. The classifier is preferably a non-binary classifier. When the moving vehicle is equipped with a global positioning system which provides world coordinates to the moving vehicle, the detection, classification and/or decision may be verified based on the world coordinates.

According to the present invention there is provided a method for detecting and identifying a traffic sign in a computerized system mounted on a moving vehicle. The system includes a camera which captures in real time multiple image frames of the environment in the field of view of the camera and transfers the image frames to an image processor. The processor is programmed for performing the detection of the traffic sign and for performing another driver assistance function. The image frames are partitioned into the image processor into a first portion of the image frames for the detection of the traffic sign and into a second portion of the image frames for the other driver assistance function. The first partition includes first setting a camera parameter for the detection of the traffic sign while capturing said image frames of the first portion. The second partition includes second setting the camera parameter for the other driver assistance function while capturing the image frames of the second portion. Upon detecting an image suspected to be of the traffic sign in at least one of said image frames of either the first portion or the second portion, tracking the image in the image frames from either the first or second portions. The tracking is performed without altering the camera parameter.

According to the present invention there is provided the system which performs the methods as disclosed herein.

BRIEF DESCRIPTION OF THE DRAWINGS

The present invention will be understood from the detailed description given herein below and the accompanying drawings, which are given by way of illustration and example only and thus not limitative of the present invention, and wherein.

DESCRIPTION OF THE PREFERRED EMBODIMENTS

Figure 1:
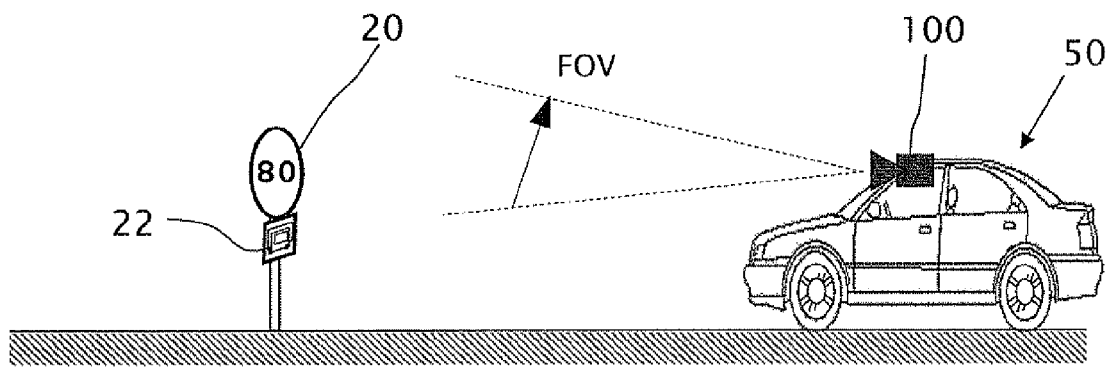
FIG. 1 is a drawing of a moving vehicle equipped with a driver assistance system including traffic sign recognition, according to an embodiment of the present invention.

The present invention is an improved driver assistance system mounted on a vehicle which performs traffic sign detection, classification and recognition. In traffic environments, traffic signs regulate traffic, warn the driver and command or prohibit certain actions. Real-time and robust automatic traffic sign detection, classification and recognition can support the driver, and thus, significantly increase driving safety and comfort. For instance, traffic sign recognition can used to remind the driver of the current speed limit, and to prevent him from performing inappropriate actions such as entering a one-way street or passing another car in a no passing zone. Further, traffic sign recognition can be integrated into an adaptive cruise control (ACC) for less stressful driving.

Before explaining embodiments of the invention in detail, it is to be understood that the invention is not limited in its application to the details of construction and the arrangement of the components set forth in the host description or illustrated in the drawings. Unless otherwise defined, all technical and scientific terms used herein have the same meaning as commonly understood by one of ordinary skill in the art of the invention belongs. The methods and examples provided herein are illustrative only and not intended to be limiting.

Figure 3:
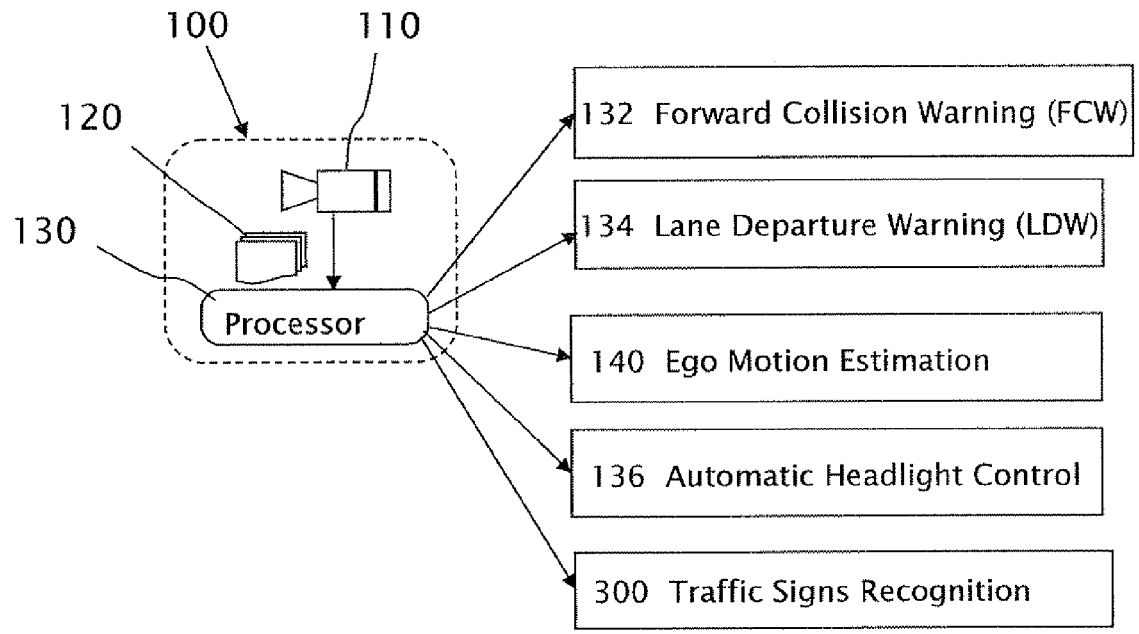
FIG. 3 is a simplified system block diagram illustrating multiple vehicle control applications operative using a single camera and processor.

Reference is made to FIG. 1 and FIG. 3 which illustrate an exemplary vehicle control system 100 including a camera or image sensor 110 mounted in a moving vehicle 50 imaging a field of view (FOV) in the forward direction. Within the field of view of camera 110 is a traffic sign 20 and a supplementary sign 22 mounted under traffic sign 20. Image sensor 110 typically delivers images of the environment in real time and the images are captured in a series of image frames 120. An image processor 130 is used to process image frames 120 and perform a number of driver assistance or vehicle control applications Exemplary Vehicle Control Applications Include:

Block 132—Collision Warning is disclosed in U.S. Pat. No. 7,113,867 by Stein, and included herein by reference for all purposes as if entirely set forth herein. Time to collision is determined based on information from multiple images 15 captured in real time using camera 110 mounted in vehicle 50.

Block 134—Lane Departure Warning (LDW), as disclosed in U.S. Pat. No. 7,151,996 included herein by reference for all purposes as if entirely set forth herein. If a moving vehicle has inadvertently moved out of its lane of travel based on image information from image frames 120 from forward looking camera 110, then system 100 signals the driver accordingly.

Block 136—An automatic headlight control (AHC) system 136 for lowering high beams of host vehicle 50 when the oncoming vehicle is detected using image frames 120. An automatic headlight control (AHC) system is disclosed in US patent application publication US20070221822 included herein by reference for all purposes as if entirely set forth herein.

Block 140—Ego-motion estimation is disclosed in U.S. Pat. No. 6,704,621 by Stein and included herein by reference for all purposes as if entirely set forth herein. Image information is received from image frames 120 recorded as host vehicle 50 moves along a roadway. The image information is processed to generate an ego-motion estimate of host vehicle 50 including the translation of host vehicle 50 in the forward direction and rotation of host vehicle 50.

Block 300—A traffic sign recognition system 300, is preferably used in combination with one or more other multiple vehicle control applications (e.g. 132, 134, 136, 140 ) which are installed and operate simultaneously using single camera 110 preferably mounted near the windshield of vehicle 50 for capturing image frames 120 in the forward direction.

Figure 2:
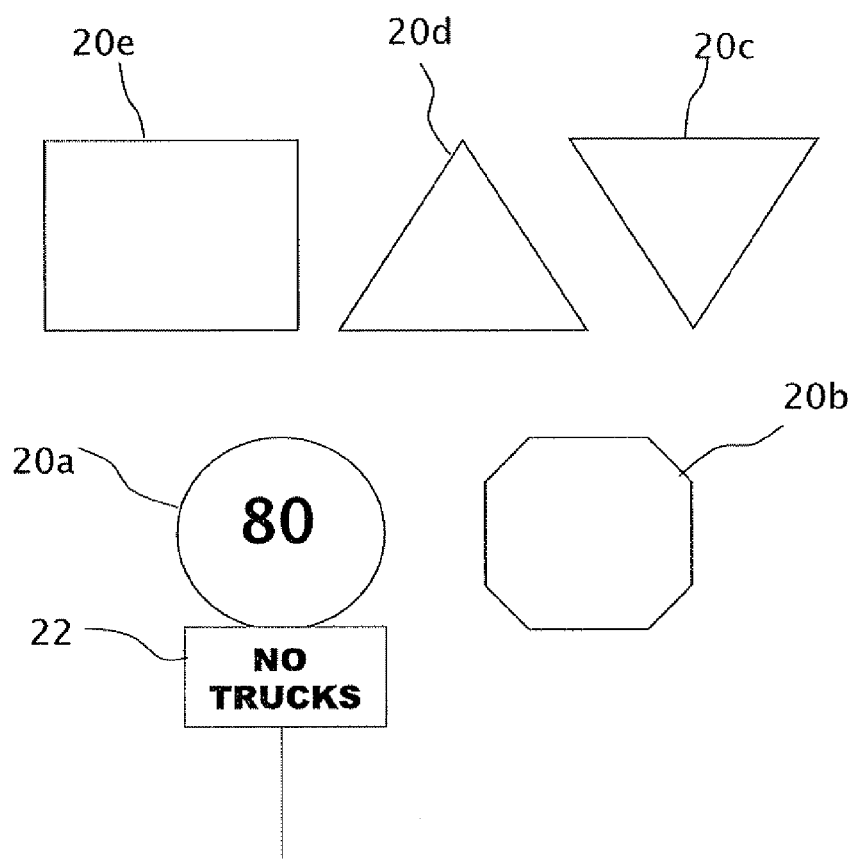
FIG. 2 illustrates different shapes of traffic signs shapes for recognition by a driver assistance system, according to an embodiment of the present invention.

FIG. 2 illustrates traffic signs' shapes circle 20a, octagon 20b, triangles 20c, 20d and rectangle 20e to be recognized. Supplementary sign 22 is also shown. It should be noted that while the discussion herein is directed detection and classification of a circular sign 20a, the principles of the present invention may be adapted for use in, and provide benefit for other sign shapes. Further the detection and classification mechanism may be of any such mechanisms known in the art.

A circle detection algorithm useful for detecting circular signs 20a can be summarized as follows:

first we approximate circles as squares and look for edge support along the center portion of the sides of the square. We use a clever manipulation of the bitmaps to get higher throughput but could alternatively have used specialized hardware, too.

Then we approximate the circle as an octagon and look for diagonal support at 45 degrees Finally we look for circles using the Hough transform to detect the circles and then a classifier for accurate positioning.

Figure 4:
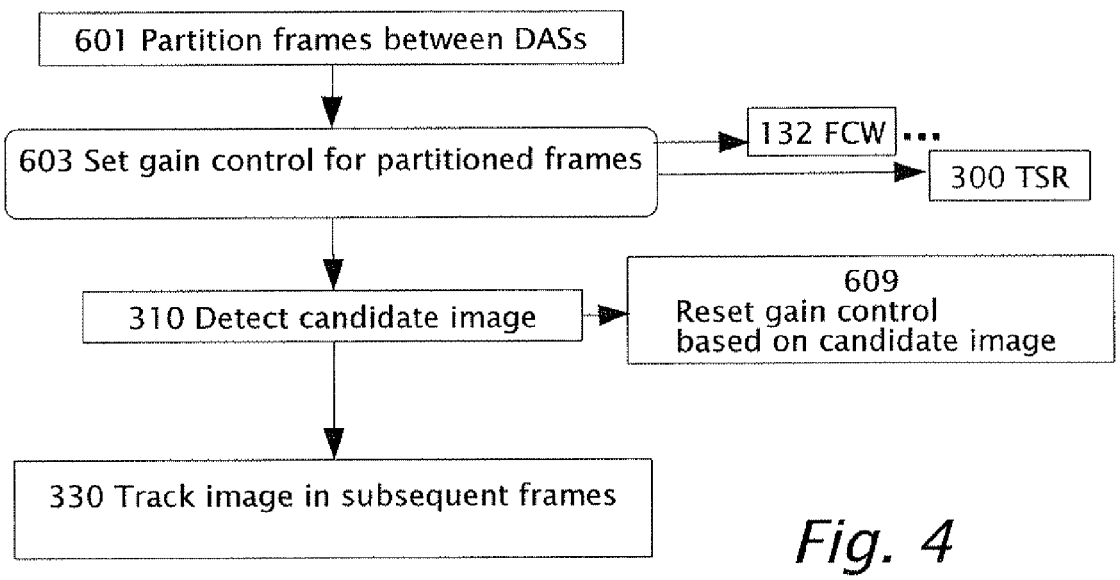
FIG. 4 is a flow diagram which illustrates a method for traffic sign recognition, according to embodiments of the present invention.

Reference is now made to FIG. 4 a simplified flow diagram of a method, according to an embodiment of the present invention. Under certain operating conditions, image sensor 110 captures image frames 120 at a frequency (e.g. 60 Hz. ) which is much higher than the frequency (e.g. 15 Hz.) of processing captured image frames 120. In such a situation, image frames 120 output from single camera 110 are typically partitioned (step 601) between the multiple vehicle control applications in use. For example, a first image frame 120 is captured and dedicated for use by collision warning system 132 and a second image frame 120 is captured for use by headlight control system 136. Typically, each vehicle control application sets (step 603) parameters for its dedicated image frames 120 such as electronic gain (or image brightness). Using one or more known methods, a candidate image, a portion of image frame 120 suspected to be of a traffic sign, is detected (step 310). The candidate image is tracked (step 330). After an image which is suspected to be of a traffic sign 20 is detected (step 310), traffic signs recognition 300 resets (step 609) the gain control based on the image information from the candidate image, ignoring the rest of the image frame information. A histogram of intensity values is preferably calculated and the gain is reset (step 609) for instance based on the median intensity value of the candidate image. The gain of the frames partitioned for the other driver assistance system is preferably unchanged.

In embodiments of the present invention, the parameters set for an automatic gain control (AGC) alternately change between N previously defined settings. Each sequence of image frames acquired from each AGC setting is used by a designated driver assisting application. For example, image frame $F_{(i)}$ is used by LDW sub-system 134 and image frame $F_{(i+1)}$ is used by traffic sign recognition 300. Image frame $F_{(i+2)}$ is used by LDW 134 and image frame $F_{(i+3)}$ is used by TSR 300 and so and so forth. In another example, image frame $F_{(i)}$ is used by LDW sub-system 134, image frame $F_{(i+1)}$ is used by FCW sub-system 132 and image frame $F_{(i+2)}$ is used by TSR 300. Image frame $F_{(i+3)}$ is used by LDW 134, image frame $F_{(i+4)}$ is used by FCW sub-system 132 and image frame $F_{(i+5)}$ is used by TSR 300 and son and so forth. System 100 may use multiple gain control settings to detect (step 310) traffic signs, which may prove to be effective, for example, when a low sun is behind the host vehicle.

In many countries there are long stretches of freeways where there is no official speed limit (e.g., the autobahn in Germany). In such countries, where there might be critical traffic signs, e.g. change in speed limit due to construction, it is important to be able to recognize the traffic signs 20 and alert the driver. As the speed of moving vehicle increases (e.g. 60 kilometers per hour to 120 kilometers per hour) the time available for detecting and recognizing a specific traffic sign 20 is decreased (e.g. halved ) over multiple image frames 120. For other DASs, e.g forward collision warning 132 or lane departure warning 134 the processing time required does not scale directly with the speed of moving vehicle 50. In some embodiments of the present invention, the use of frames 120 partitioned for other driver assistance systems depends on the speed of moving vehicle 50.

In embodiments of the present invention, TSR 300 of vehicle control system 100 is used in conjunction with other driver assistance systems, whereas information is exchanged between traffic sign recognitions and other driver assistance systems.

In some countries, a truck has a sign on the vehicle back, indicating a maximum speed limit. In the case of a traffic sign 20, host vehicle 50 is moving relative to traffic sign 20. In the case of a "speed limit sign", on a leading truck also traveling in the forward direction, the relative movement is significantly less. The presence of the truck can be verified by information from FCW application 132, (assuming FCW application 132 has detected the truck in front of the host vehicle). Similarly if the truck pulls over or parks, the speed limit sign on the back of the truck appears as a static traffic sign. Checking with LDW application 134 can verify that the "sign" is in a parking lane and is therefore not a valid traffic sign 20.

Multiple speed limit signs can be placed at an intersection, for example: one speed limit traffic sign indicating the current speed limit, the other speed limit traffic sign indicating the speed limit for an off-ramp, or a speed limit traffic sign with an arrow pointing to the off ramp. TSR 300 integrated with LDW sub-system 134 indicates in which lane the driver is currently in and thus recognizes the proper speed limit from the valid traffic sign 20.

If host vehicle SO is equipped with ego-motion estimation 140, which estimates from image frames 120 an ego-motion including a translation in the forward direction and rotation of moving vehicle 50. Tracking (step 330) is preferably performed while calibrating at least in part the effect of the ego-motion. Further processing of the image is preferably preempted if the motion of the image in image space between the image frames is inconsistent with a static traffic sign.

Figure 5:
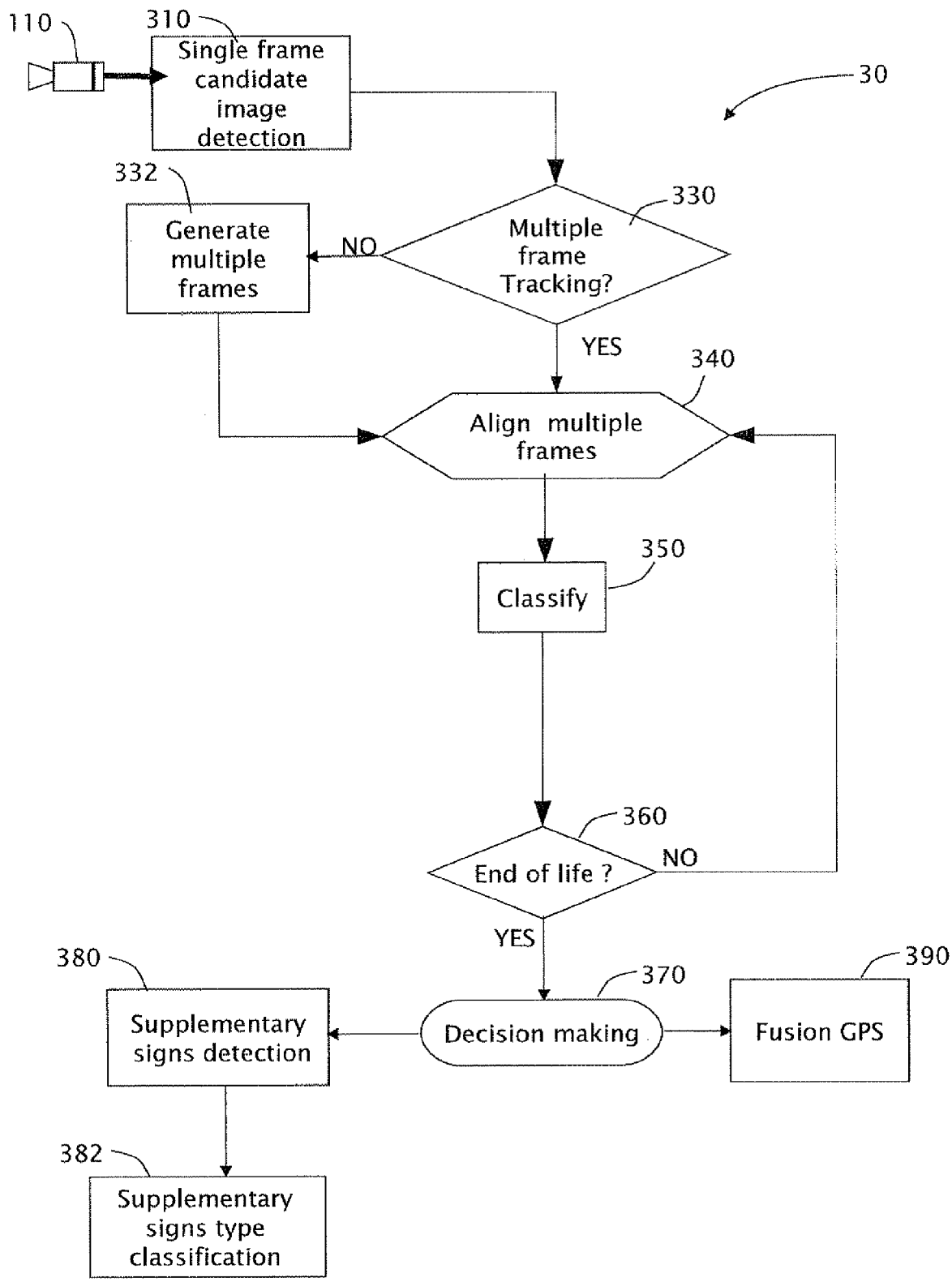
FIG. 5 is a flow diagram which illustrates a method for traffic sign recognition, according to embodiments of the present invention.

FIG. 5 is a diagram that illustrates method 30 for traffic sign recognition using system 100, according to embodiments of the present invention. Method 30 includes both detection (step 310) of a traffic sign and classifying the detected traffic sign to identify the traffic sign type.

Method 30 Includes the Following Steps:

Step 310: Single-Frame Detection.

Initially, method 30 obtains a candidate image suspected to be of a traffic sign 20. As an example of single frame detection 310, a candidate image may include a circle and detection may be performed based on a circle detection algorithm, e.g. the circular Hough Transform. Since the radius of circular traffic signs is known, the resolution and the focal length of camera 110 is also known, the algorithm of single frame detection (step 310) is preferably directed to search for circles within a range of radii in pixels in image space for circular traffic signs 20*a*. To reduce computational complexity, detection (step 310) may operate with resolution less than the resolution of image sensor 110. Detection (step 310) is typically different between day and night. At night, headlights of moving vehicle 50 strongly illuminate traffic signs 20 until the image of traffic sign 20 is very bright, typically saturating image sensor 110. Detection (step 310) at night detects light spots in the image, typically in a low resolution image. The shape of a detected spot is analyzed preferably in a higher resolution image by evaluating gray scale (or intensity) gradients the detected image spot in several directions in image space.

Step 330: Tracking: Candidate circles obtained in step 310 from current image frame 120 are matched with corresponding candidates obtained from a previous frame 120, detected previously in step 310. A multi-frame structure is verified over multiple frames 120 and thereby the confidence to be of a real traffic sign 20, is increased. The procedure of building multi-frame structure along several frames 120 is referred to as tracking If the single frame detected is part of a multi-frame structure then the frames are aligned (step 340). Otherwise in step 332 the current single-frame candidate is used to generate (step 332) a multi-frame data structure.

Step 340: Align corresponding image portions, containing a candidate to represent a traffic sign, in frames 120 of a multi-frame structure. Since host vehicle 50 is in motion, the position of a candidate in current image frame 120 is different than the location of the corresponding candidate in the previously acquired image frame 120. Thereby, method 30 uses an alignment mechanism to refine the candidate position in a specific frame 120. Optionally, alignment (step 340) is performed on selected image frames 120.

Step 350: A classification process is performed on each frame 120 of a tracked multi-frame structure. The scores and types of signs which are identified are used later for generating a final decision over the types of traffic sign the multi-frame structure represents. The classification method, according to embodiments of the present invention is preferably a multi-level classification that constructs a gating tree, which decides the signs relationship to decreasing levels of sign families, i.e., electronic signs, start zone signs, end zone signs, etc., and finally giving a decision, based on a comparison of several relatively close options. The classifier selects a class having the best score (in terms of classification scores/ probability) or N best classes and their scores. This information is used later by the high-level decision mechanism (step 370) in establishing the final type of the classified candidate.

The multi-frame data structure is complete when an end of life occurs and the traffic sign of interest is no longer in the field of view of camera 110, or when a multi-frame structure cannot be further tracked due to tracking problem or when it is occluded. A decision is made (step 370) based on the output of the classification (step 350) for each image in the multiple frame structure. According to an embodiment of the present invention, if a supplementary sign 22 is present in the frames, a secondary algorithm is optionally implemented for recognizing the supplementary sign 22. The high-level mechanism also turns on a supplementary-signs 22 recognition algorithm. For example, if the detected traffic sign 20 is a speed limit sign 20*a* a supplementary sign 22 containing, for example, conditions that if met, the speed limit comes into force. Supplementary-signs 22 are typically a rectangular sign 20*e*, thereby the detection algorithm is preferably directed to search first for a rectangular shape. Upon detection of a supplementary-sign 22 (step 380) classify and identify the type of supplementary sign 22. If other vehicle systems are present, for instance a global positioning system (GPS) and/or an electronic map, the recognition of the traffic sign may be verified (step 390) by comparing with the GPS and/or electronic map.

While detecting (step 310 )a single-frame candidate is performed at a slow rate, for example 15 frames per second, the alignment (step 340) and classification (step 350) processes can preferably match the camera frame rate capabilities. If, for example the camera frame rate is 45 FPS, for each frame 120 processed to detect (step 310 ) single-frame candidates, the alignment (step 340) and classification (step 350) can be typically be performed on three frames 120. Therefore, while a frame 120 is detected in step 310, method 300 checks if a relevant traffic sign was identified in frames 120 processed thus far.

Figure 6:
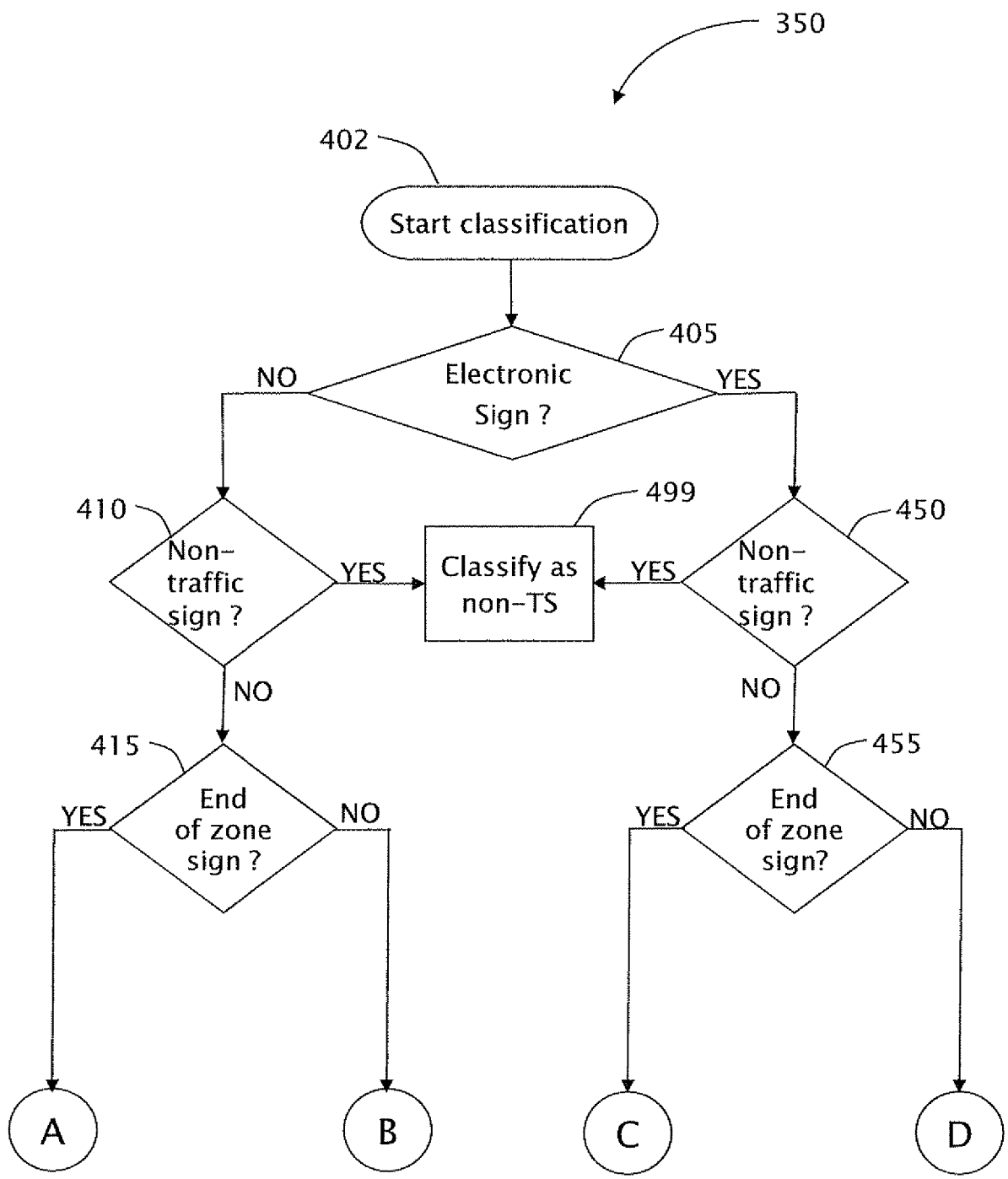
FIG. 6 is a flow diagram that exemplifies a method for multi level classification of circular traffic signs, according to embodiments of the present invention.

Reference is now made to FIG. 6, which is a simplified flow diagram that exemplifies a method 350 for non-binary classification of circular traffic signs (TS) 20*a*, according to embodiments of the present invention. The classification starts (step 402) by classifying major classes of TS 20*a* types. In the example, classification method 350 discriminates between electronic and non-electronic traffic signs 20*a* (decision box 405). An electronic (or electrical) sign is characterized by an array of lights powered by electricity. Decision boxes 410 and 450 perform fast first rejection of non-TS candidates, which have been determined not to be traffic signs. Candidates that have been determined not to be traffic signs are classified as non-TS (step 499).

Figure 7:
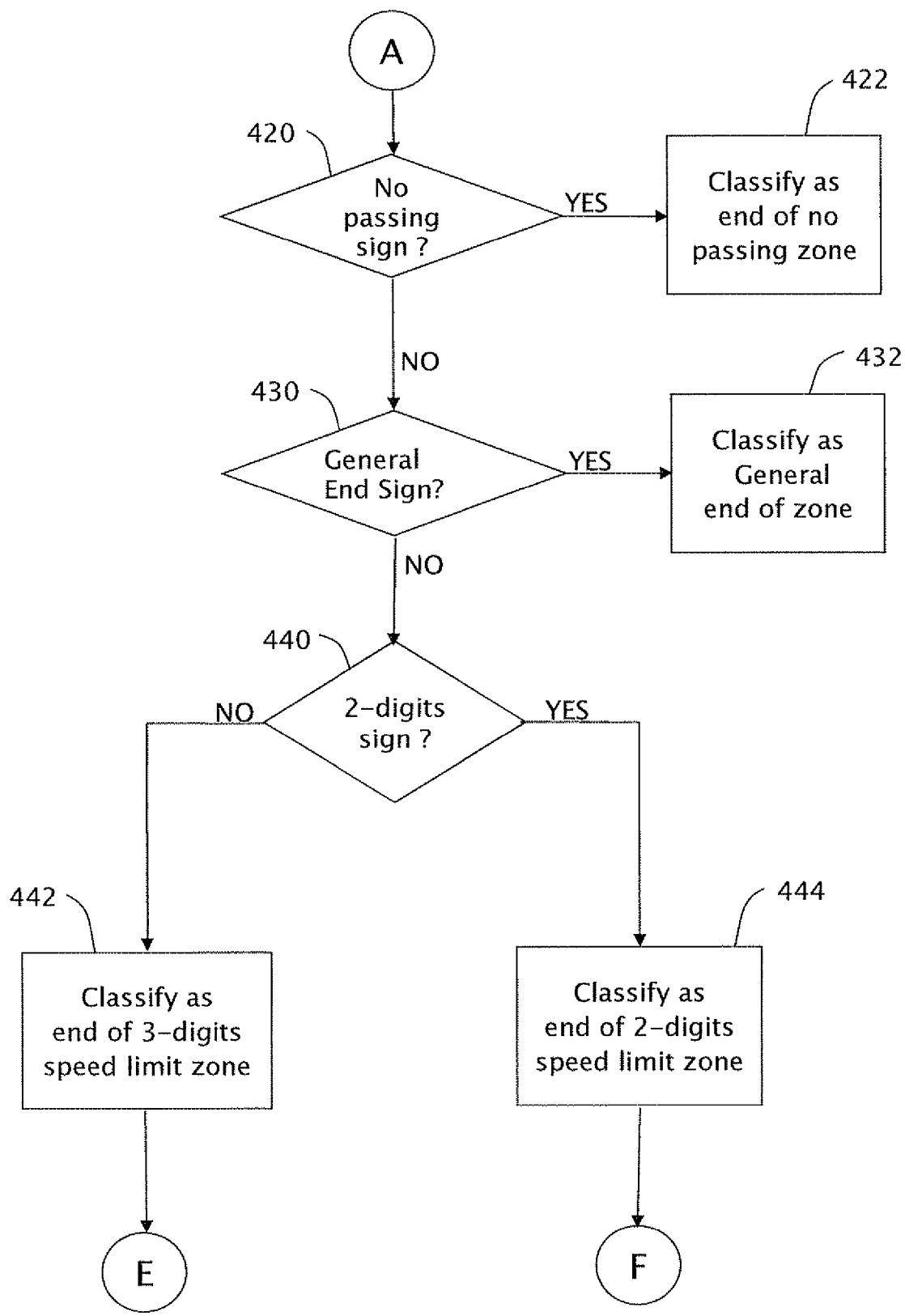
FIG. 7 is a continuation of the flow diagram of FIG. 6, showing classification of non-electronic, end zone type circular traffic signs, according to embodiments of the present invention.

The remainder of the candidates are preferably further classified by classifying other major classes of TS 20*a* types. In the example shown, end-of-zone type traffic signs 20*a* are tested in decision boxes 415 and 455. Step 415 results either in non-electronic end-of-zone class of traffic signs 20*a*, or in non-electronic non-end-of-zone class of traffic signs 20*a*. Step 455 results either in electronic end-of-zone class of traffic signs 20*a*, or in electronic non-end-of-zone class of traffic signs 20*a*, FIG. 7 is a continuation A of method 350, showing classification of non-electronic, end zone type circular traffic signs 20*a*, according to embodiments of the present invention. Step 420, identifies an end-of-no passing-zone-traffic signs 20*a*.

Traffic signs 20a that have been identified as end-of-no-passing zone traffic signs 20a are classified as such in step 422. In step 430, general end of zone traffic signs 20a are identified. Traffic signs 20a that have been identified as end of zone traffic signs 20a are classified as such in step 432. Classification proceeds (step 440) by the number of digits the candidate speed limit traffic signs 20a contains. Candidate speed limit traffic signs 20a that have been identified and classified as containing exactly two digits (step 444) proceed in diagram node E. Candidate speed limit traffic signs 20a that have been identified and classified as containing exactly three digits (step 442) proceed in diagram node F.

Figure 8:
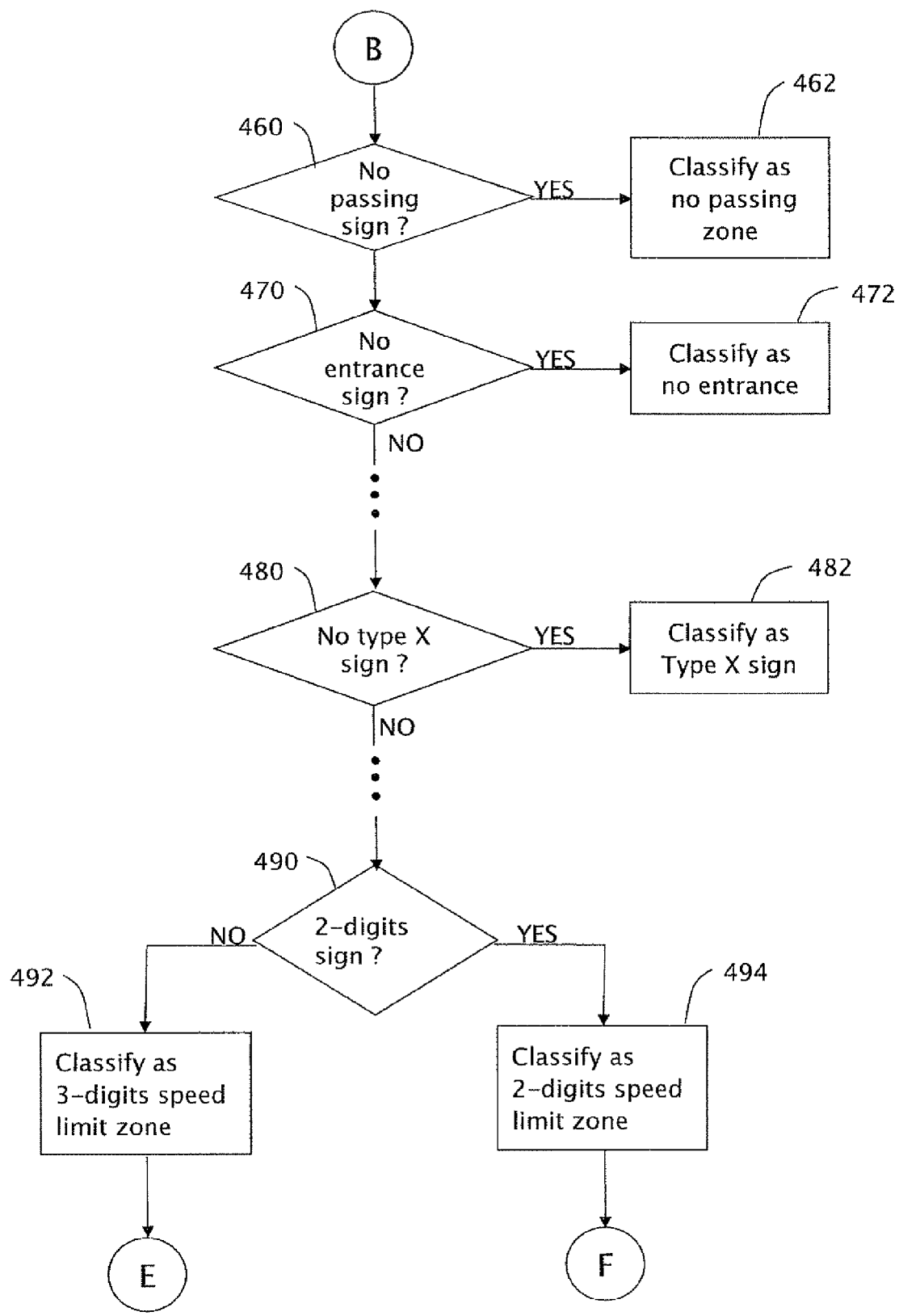
FIG. 8 is a continuation of the flow diagram in FIG. 6, showing classification of non-electronic, non-end zone type circular traffic signs, according to embodiments of the present invention.

FIG. 8 is a continuation B of method 350 shown in FIG. 6, showing classification of non-electronic, starting zone type circular traffic signs 20a, according to embodiments of the present invention. In step 460, start-of-no-passing zone traffic signs 20a is identified. Traffic signs 20a that have been identified as non-electronic, start-of-no-passing-zone traffic signs 20a are classified as such in step 462. Traffic signs 20a that have been identified as non-electronic, no entrance traffic signs 20a are classified as such in step 472. Traffic signs 20a that have been identified (step 480) as the selected traffic signs 20a (non-electronic) are classified as such in step 482. Example method 350 proceeds in identifying and classifying speed limit traffic signs 20a by the number of digits the candidate speed limit traffic signs 20a contains (step 490). Candidate speed limit traffic signs 20a that have been identified and classified as containing exactly two digits (step 494) proceed in diagram node E. Candidate speed limit traffic signs 20a that have been identified and classified as containing exactly three digits (step 492) proceed in diagram node F.

Figure 9:
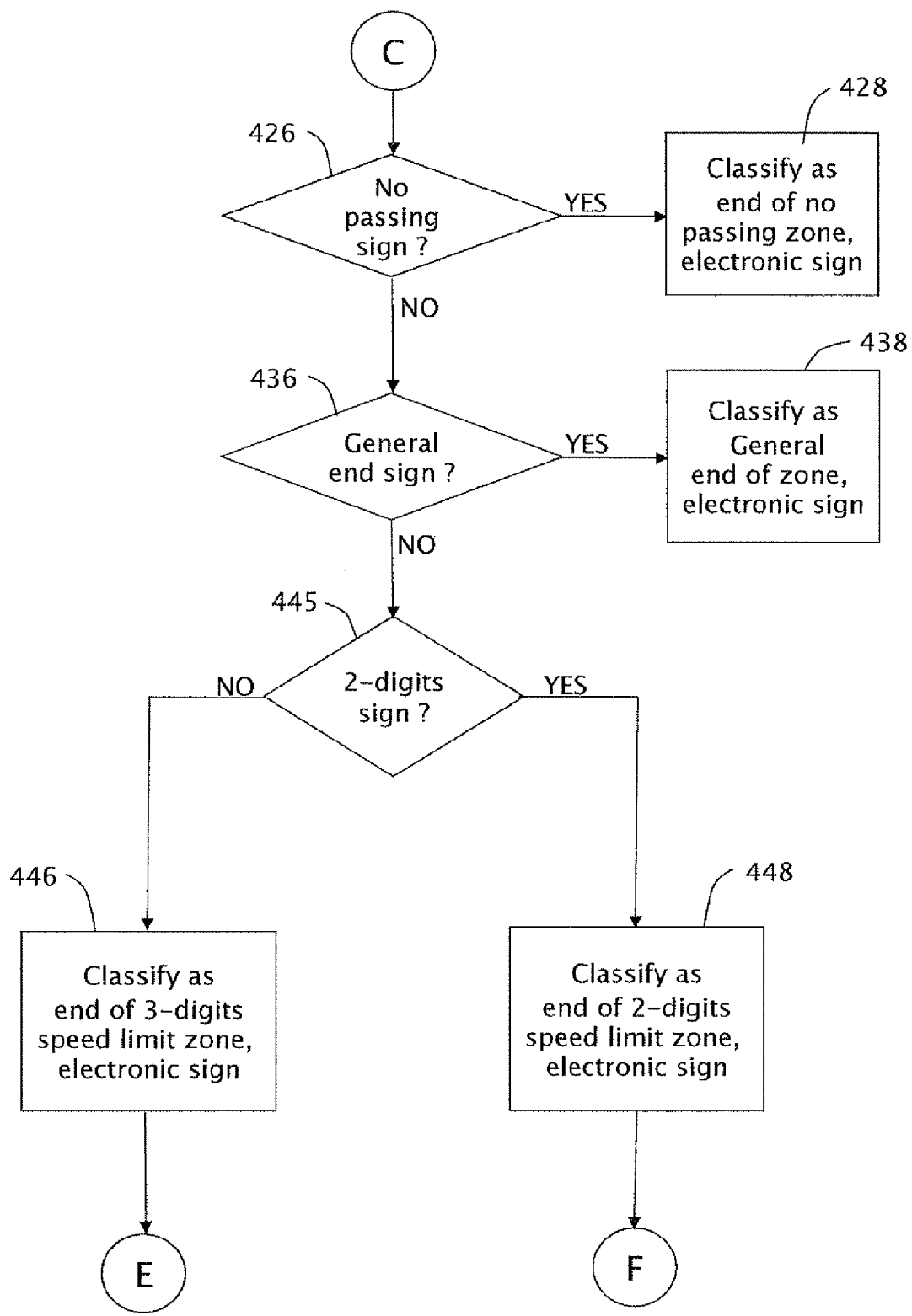
FIG. 9 is a continuation of the flow diagram shown in FIG. 6, showing classification of electronic, end zone type circular traffic signs, according to embodiments of the present invention.

FIG. 9 is a continuation C of method 350. Traffic signs 20a that have been identified (step 426) as electronic, end-of-no-passing-zone traffic signs 20a are classified as such in step 428. In step 436, electronic, general end of zone traffic signs 20a are identified. Traffic signs 20a that have been identified as electronic, end of zone traffic signs 20a are classified as such in step 438. Method 350 proceeds in identifying and classifying speed limit traffic signs 20a by the number of digits the candidate speed limit traffic signs 20a contains (step 445). Candidate speed limit traffic signs 20a that have been identified and classified as containing exactly two digits (step 448) proceed in diagram node E. Candidate speed limit traffic signs 20a that have been identified and classified as containing exactly three digits (step 446) proceed in diagram node F.

Figure 10:
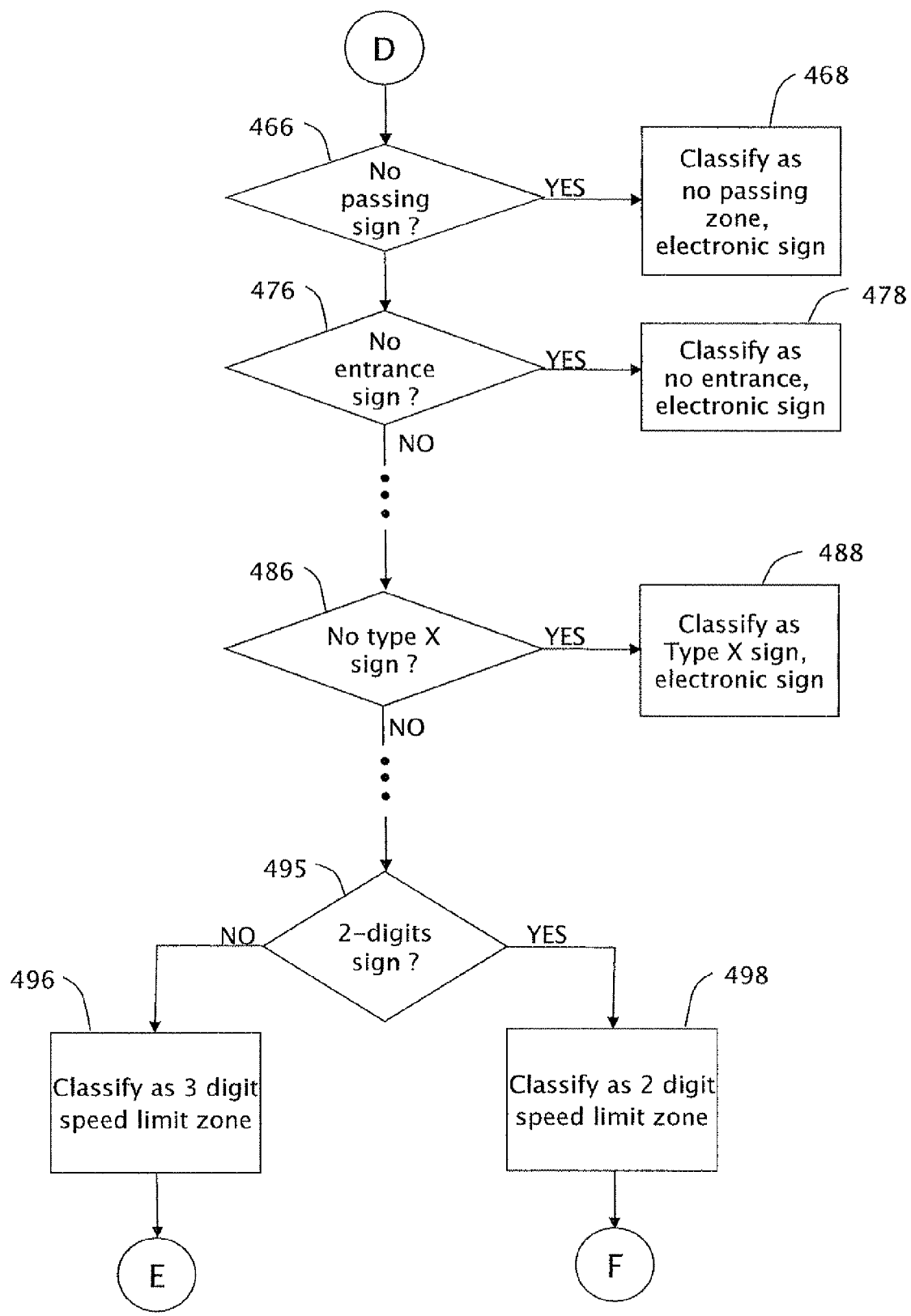
FIG. 10 is a continuation of the method shown in FIG. 6, showing classification of electronic, non-end zone type circular traffic signs, according to embodiments of the present invention.

FIG. 10 is a continuation B of method 350, showing classification of electronic, starting zone type circular traffic signs 20a, according to embodiments of the present invention. In step 466, start of electronic, no passing zone traffic signs 20a are identified. Traffic signs 20a that have been identified as electronic, start of no passing zone traffic signs 20a are classified as such in step 468. In step 476, electronic, no entrance traffic signs 20a are identified. Traffic signs 20a that have been identified as electronic, no entrance traffic signs 20a are classified as such in step 478. In step 486, any other electronic, selected type X of traffic signs 20a are identified. Traffic signs 20a that have been identified as the selected traffic signs 20a are classified as such in step 488. Method 350 proceeds in identifying and classifying speed limit traffic signs 20a by the number of digits the candidate speed limit traffic signs 20a contains (step 495). Candidate speed limit traffic signs 20a that have been identified and classified as containing exactly two digits (step 498) proceed in diagram node E. Candidate speed limit traffic signs 20a that have been identified and classified as containing exactly three digits (step 496) proceed in diagram node F.

Figure 11:
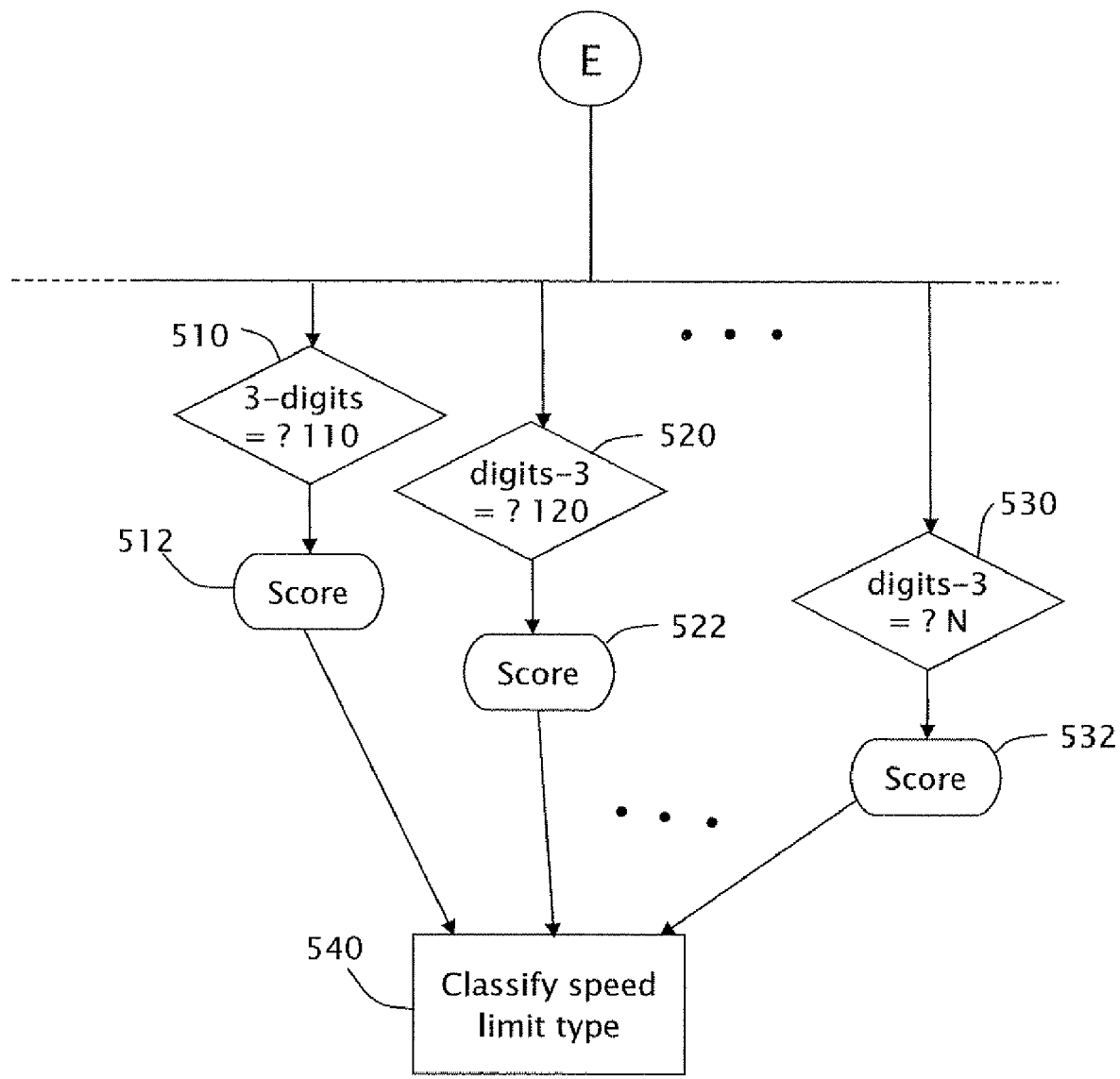
FIG. 11 is a continuation of the method shown in FIGS. 6, 7, 8, 9 and 10, showing non-binary classification 3-digit speed limit type traffic signs, according to embodiments of the present invention.

Reference is now made to FIG. 11, which is a continuation E of method 350 shown in FIGS. 6, 7, 8, 9 and 10, showing non-binary classification three digit speed limit type traffic signs 20a, according to embodiments of the present invention. The non-binary classification classifies each candidate three digit speed limit type traffic signs 20a against training sets of all possible three digit speed limit type traffic signs 20a, for example: 110, 120, 130, etc (steps 510, 520 and 530). The classification against each training set receives a score (steps 512, 522 and 532). In step 540, method 350 selects the highest score the classify the candidate three digit speed limit type traffic signs 20a to the class associated with the highest score.

Figure 12:
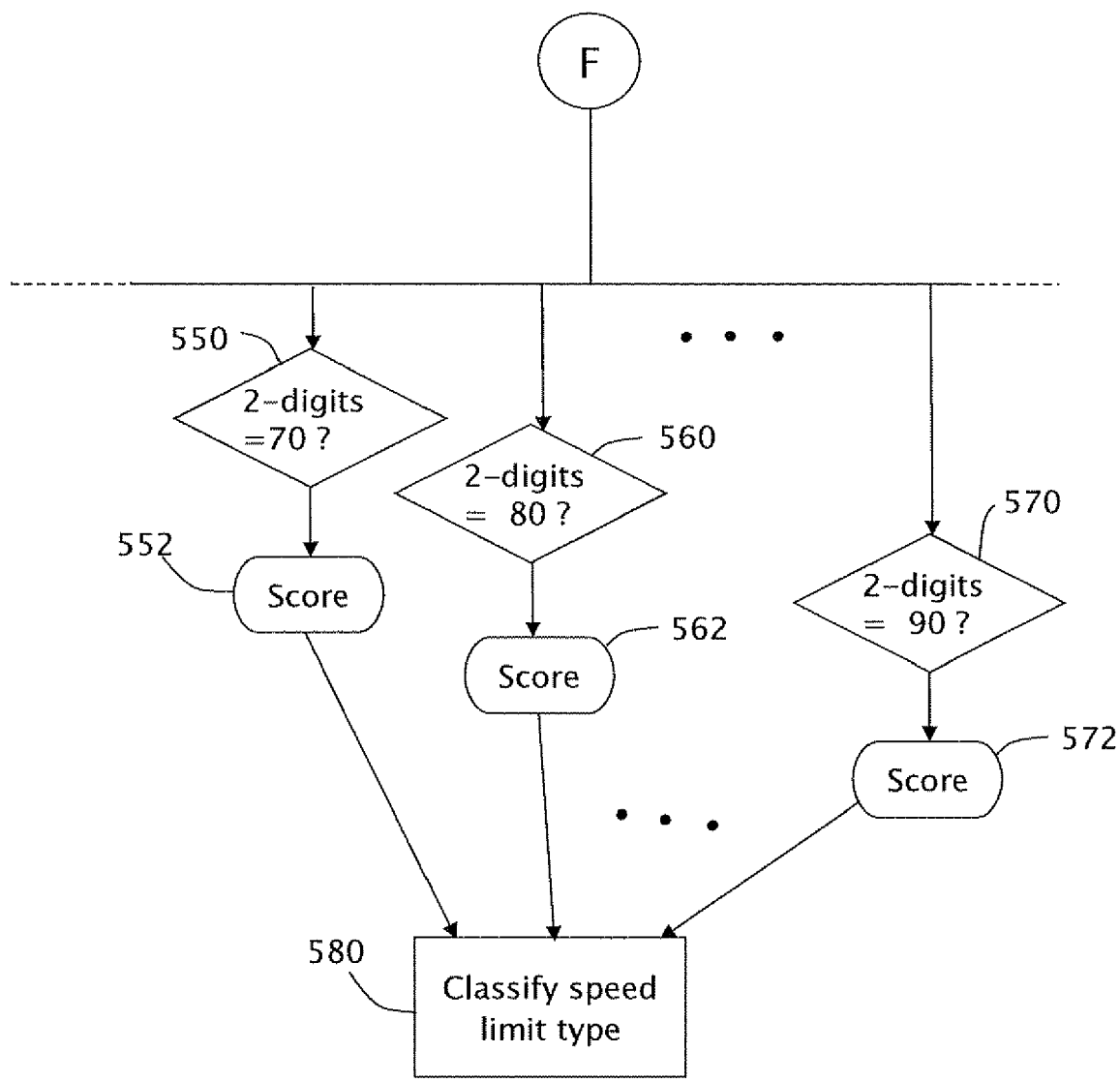
FIG. 12 is a continuation of the of the flow diagram shown in FIGS. 6, 7, 8, 9 and 10, showing non-binary classification 2-digit speed limit type traffic signs, according to embodiments of the present invention.

FIG. 12 is a continuation F of method 350 shown in FIGS. 6, 7, 8, 9 and 10, showing non-binary classification two digit speed limit type traffic signs 20a, according to embodiments of the present invention. The non-binary classification classifies each candidate two digit speed limit type traffic signs 20a against training sets of all possible two digit speed limit type traffic signs 20a, for example: 70, 80, 90 MPH, etc (steps 550, 560 and 570). The classification against each training set receives a score (steps 552, 562 and 572). In step 580, method 350 selects the highest score to classify the candidate two digit speed limit type traffic signs 20a into the class associated with the highest score.

It should be noted that in segments B and D, type X of circular traffic sign 20a can be any circular traffic sign 20a used or a subset of all possible circular traffic sign 20a. It should be further noted that method 350 is given by way of example only and other TS 20 shapes and types can be classified in similar ways. The classification order can also be change and the set of traffic signs 20 that are of interest can be changed.

The invention being thus described in terms of embodiments and examples, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method identifying a traffic sign using a computerized system mounted on a moving vehicle, the system including a camera mounted on the moving vehicle, wherein the camera captures in real time a plurality of image frames of the environment in the field of view of the camera and transfers the image frames to an image processor, the method comprising the steps of:

(a) programming the processor for performing the detecting of the traffic sign and for performing another driver assistance function;

(b) first partitioning a first portion of the image frames to the image processor for the detecting of the traffic sign and second partitioning a second portion of the image frames for said other driver assistance function; and (c) upon detecting an image suspected to be of the traffic sign in at least one of said image frames of said first portion, tracking said image in at least one of said image frames of said second portion.

2. The method, according to claim 1, wherein said first partitioning includes first setting a camera parameter for the detecting of the traffic sign while capturing said image frames of said first portion, and wherein said second partitioning includes second setting said camera parameter for said other driver assistance function while capturing said image frames of said second portion, wherein said first setting and said second setting have different values for said camera parameter, whereby said tracking is performed without altering said values of said camera parameter.

3. The method, according to claim 1, wherein said other driver assistance function is provided by a forward collision warning system which measures from said second portion of the image frames a distance to a lead vehicle, wherein said image scales with said distance, further comprising the step of:
(d) flagging said image as irrelevant, by associating said image to be of an object attached to said lead vehicle.

4. The method, according to claim 1, wherein said other driver assistance function is provided by a lane departure warning system from which is determined the lane in which the moving vehicle is traveling, wherein said image is of a traffic sign associated with another lane of traffic other than said lane, further comprising the step of:
(d) flagging said image as irrelevant, by associating said image as an image of traffic sign for said other lane of traffic.

5. The method, according to claim 1, wherein said other driver assistance function is provided by an ego-motion system which estimates from said second portion of the image frames an ego-motion including a translation in the forward direction and rotation of the moving vehicle,
(e) performing said tracking while calibrating at least in part the effect of said ego-motion;
(f) flagging said image as irrelevant, if after said tracking and said calibrating, the motion of said image between said image frames of said second portion is inconsistent with a static traffic sign.

6. The method, according to claim 1, further comprising the step of:
(e) classifying said image based on at least one of shape or color.

7. The method, according to claim 6, further comprising the step of, prior to said classifying:
(f) by using a group of known images of traffic signs, training a classifier for performing said classifying.

8. The method, according to claim 6, wherein said shape is a circle, and wherein said traffic sign is a circular traffic sign, further comprising the step of:
(e) based on an output of said classifier, deciding that said circular traffic sign is a speed limit circular traffic sign.

9. The method, according to claim 6, wherein said classifying said circular traffic sign as a speed limit traffic sign is performed by a non-binary classifier.

10. The method, according to claim 8, wherein the moving vehicle is equipped with a global positioning system which provides world coordinates to the moving vehicle, further comprising the step of:
(f) verifying at least one of said detecting, said classifying or said deciding based on said world coordinates.

11. The computerized system mounted on a moving vehicle, the system including a camera mounted on the moving vehicle, wherein the camera captures in real time a plurality of image frames of the environment in the field of view of the camera and transfers the image frames to an image processor, the computerized system used to perform the method steps of claim 1.

12. A method for identifying a traffic sign, using a computerized system mounted on a moving vehicle, the system including a camera mounted on the moving vehicle, wherein the camera captures in real time a plurality of image frames of the environment in the field of view of the camera and transfers the image frames to an image processor, the method comprising the steps of:
(a) programming the processor for performing the detecting of the traffic sign and for performing another driver assistance function;
(b) first partitioning a first portion of the image frames to the image processor for the detecting of the traffic sign and second partitioning a second portion of the image frames for said other driver assistance function, wherein said first partitioning includes first setting a camera parameter for the detecting of the traffic sign while capturing said image frames of said first portion, and wherein said second partitioning includes second setting said camera parameter for said other driver assistance function while capturing said image frames of said second portion; and
(c) upon detecting an image suspected to be of the traffic sign in at least one of said image frames of both said first and said second portions, tracking said image in at least one of said image frames from either said first or from said second portions, whereby said tracking is performed without altering said camera parameter by the driver assistance system which performs said other driver assistance function.

13. A method performed using a computerized system mounted on a moving vehicle, the system including a camera mounted on the moving vehicle, wherein the camera captures in real time a plurality of image frames of the environment in the field of view of the camera and transfers the image frames to an image processor, the method comprising the steps of:
programming the image processor for detecting a traffic sign and for performing another driver assistance function;
partitioning a subset of the image frames for said other driver assistance function; and
upon said detecting an image suspected to be of a traffic sign in at least one of said image frames not in said subset, classifying the image selectably either as a traffic sign or not as a traffic sign by using said subset of the image frames partitioned for said other driver assistance function.

* * * * *